United States Patent
Kim et al.

(10) Patent No.: US 8,194,804 B2
(45) Date of Patent: Jun. 5, 2012

(54) APPARATUS AND METHOD FOR AUTOMATIC GAIN CONTROL OF MOBILE STATION IN OFDM SYSTEM

(75) Inventors: Ki-Seok Kim, Gyeongju-si (KR); Young-Il Kim, Daejeon (KR)

(73) Assignees: Samsung Electronics Co., Ltd., Suwon-si (KR); Electronics and Telecommunications Research Institute, Daejeon (KR); KT Corporation, Seongnam-si (KR); SK Telecom Co., Ltd., Seoul (KR); Hanaro Telecom, Inc., Seoul (KR)

(*) Notice: Subject to any disclaimer, the term of this patent is extended or adjusted under 35 U.S.C. 154(b) by 1008 days.

(21) Appl. No.: 12/088,262

(22) PCT Filed: Sep. 29, 2006

(86) PCT No.: PCT/KR2006/003932
§ 371 (c)(1),
(2), (4) Date: Mar. 27, 2008

(87) PCT Pub. No.: WO2007/037656
PCT Pub. Date: Apr. 5, 2007

(65) Prior Publication Data
US 2008/0232518 A1    Sep. 25, 2008

(30) Foreign Application Priority Data
Sep. 30, 2005   (KR) .................. 10-2005-0091786

(51) Int. Cl.
*H04L 27/08* (2006.01)
(52) U.S. Cl. ............... 375/345; 375/260; 455/240.1
(58) Field of Classification Search ............ 375/345, 375/260; 455/234.1, 240.1, 245.1, 250.1; 370/208
See application file for complete search history.

(56) References Cited

U.S. PATENT DOCUMENTS

| 5,617,060 A * | 4/1997 | Wilson et al. ............. 330/129 |
| 6,574,292 B2 | 6/2003 | Heinonen et al. |
| 7,746,966 B2 * | 6/2010 | Lee et al. ............. 375/345 |
| 2003/0147476 A1 * | 8/2003 | Ma et al. ............. 375/329 |
| 2003/0194029 A1 * | 10/2003 | Heinonen et al. ......... 375/345 |
| 2004/0110510 A1 | 6/2004 | Jeon et al. |
| 2004/0114675 A1 | 6/2004 | Crawford |
| 2004/0161046 A1 | 8/2004 | Schott et al. |
| 2004/0190560 A1 * | 9/2004 | Maltsev et al. .......... 370/503 |
| 2005/0129155 A1 * | 6/2005 | Hoshino ............. 375/347 |
| 2005/0141626 A1 | 6/2005 | Lee et al. |
| 2005/0276359 A1 * | 12/2005 | Xiong ............. 375/345 |
| 2006/0018287 A1 * | 1/2006 | Walton et al. ............. 370/334 |
| 2006/0034401 A1 * | 2/2006 | Cho et al. ............. 375/345 |

FOREIGN PATENT DOCUMENTS

| KR | 10-2003-0049182 A | 6/2003 |
| KR | 10-2003-0097093 A | 12/2003 |
| KR | 10-2004-0050813 A | 6/2004 |
| KR | 10-2005-0041857 A | 5/2005 |
| KR | 10-2005-0064718 A | 6/2005 |
| WO | 2005/043791 A2 | 5/2005 |

* cited by examiner

*Primary Examiner* — Aristocratis Fotakis
(74) *Attorney, Agent, or Firm* — Jefferson IP Law, LLP

(57) ABSTRACT

An automatic gain control apparatus and method of a mobile station in an OFDM system are provided. The method includes identifying a preamble section and a data symbol section in a received frame signal; when a current symbol is the preamble section, measuring a power value of a preamble signal, comparing the measured power value of the preamble signal and a threshold value, and amplifying the received frame signal based on a predetermined gain; when a data symbol section includes a pilot carrier, measuring an average power value of the pilot carrier in the data symbol, comparing the measured average power value and the threshold value, and amplifying the received frame signal based on a predetermined gain; and when the data symbol section includes no pilot carrier, maintaining an existing gain, or performing an automatic gain control operation according to a gain estimated by using the pilot carrier during the data symbol section.

5 Claims, 8 Drawing Sheets

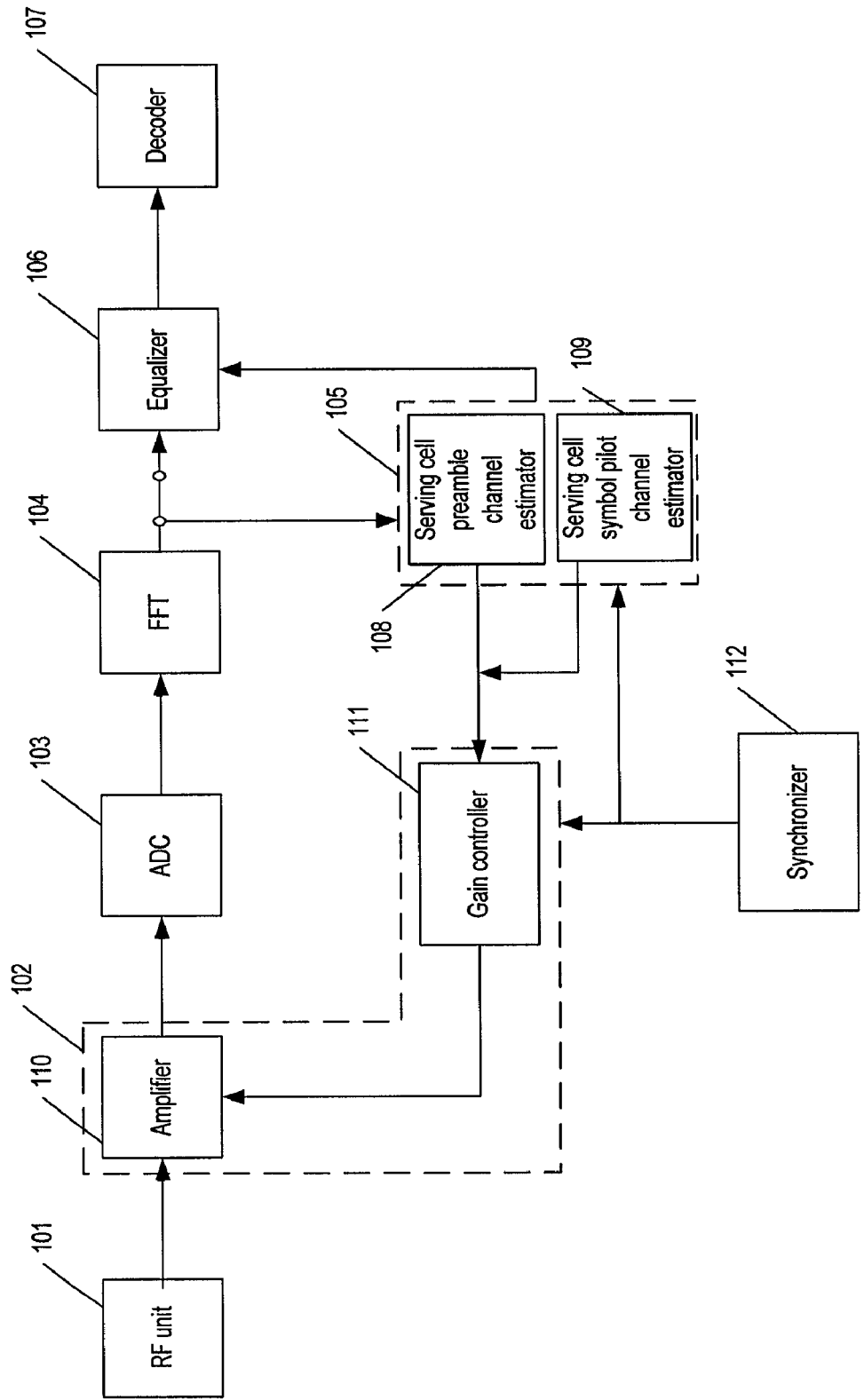
[FIG. 4]

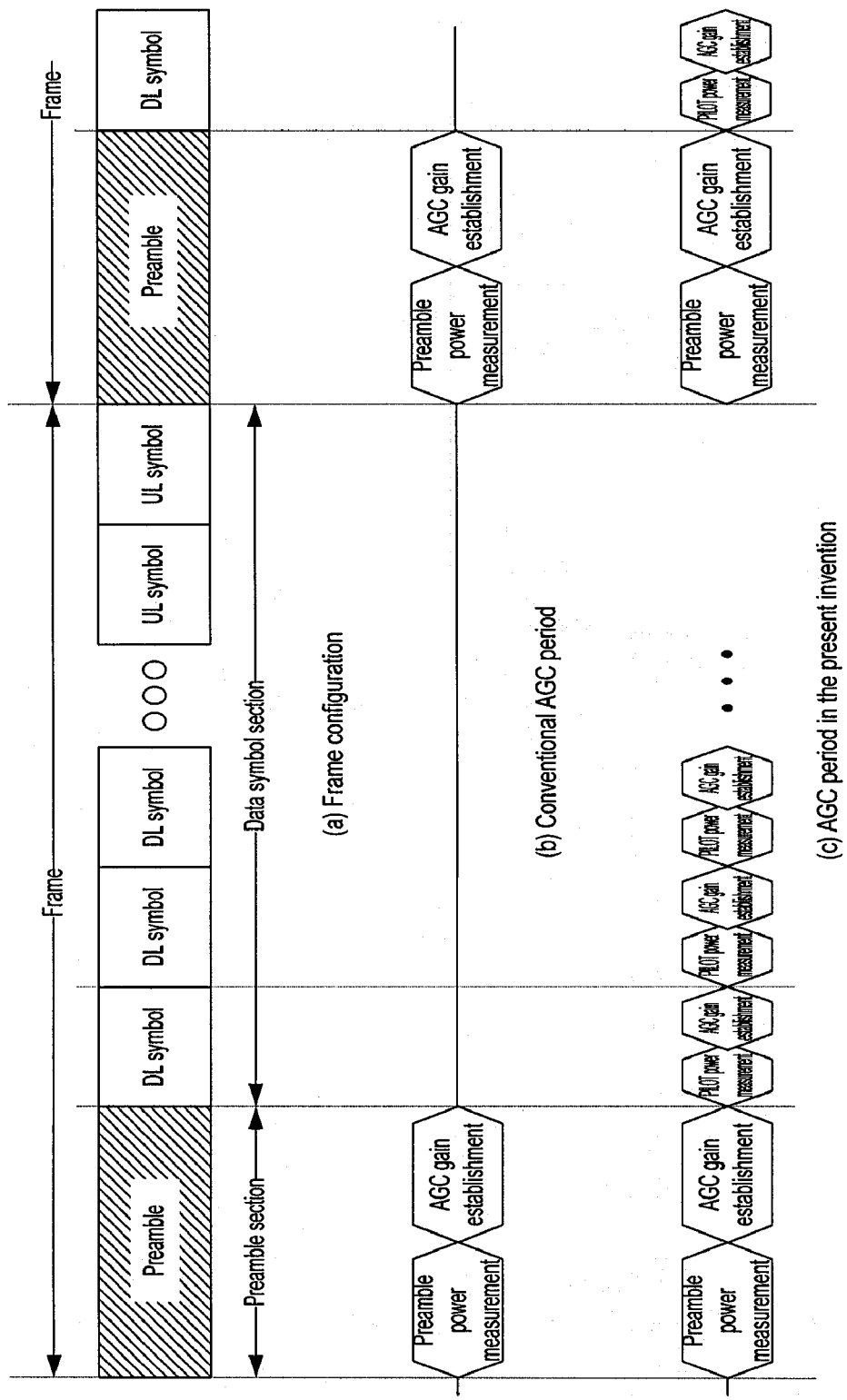
[FIG. 5]

[FIG. 6]
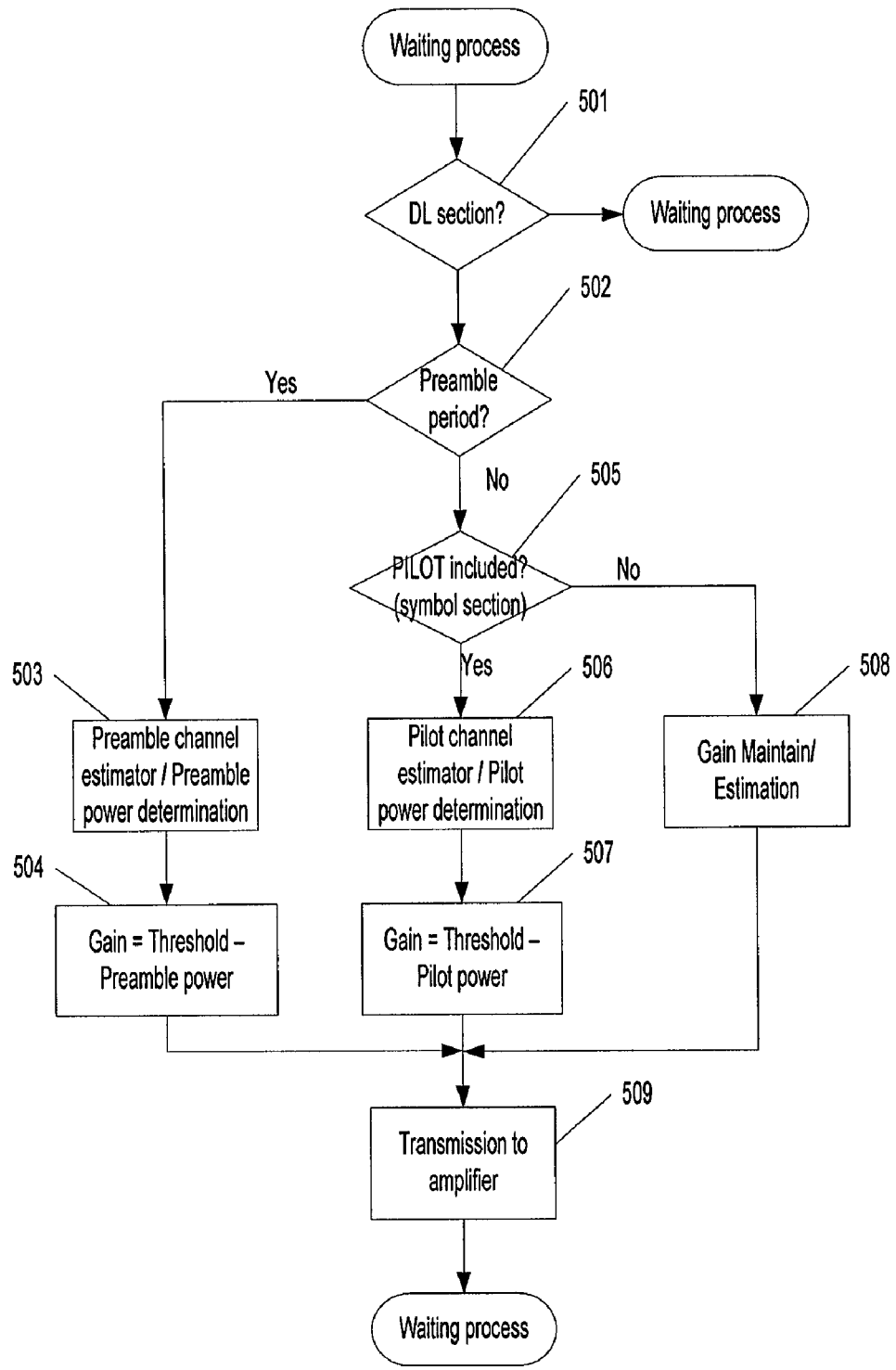

[FIG. 7]
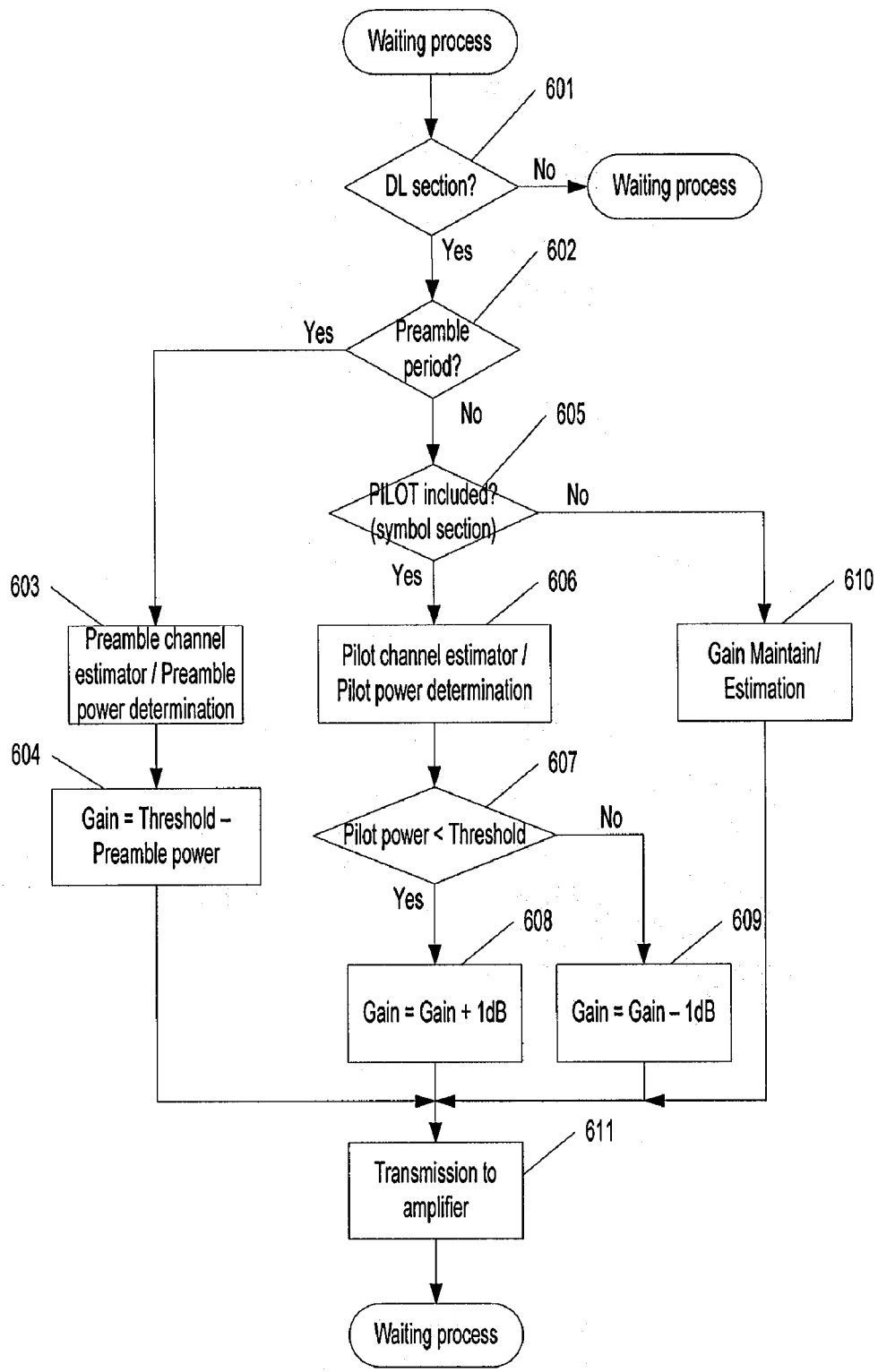

[FIG. 8]
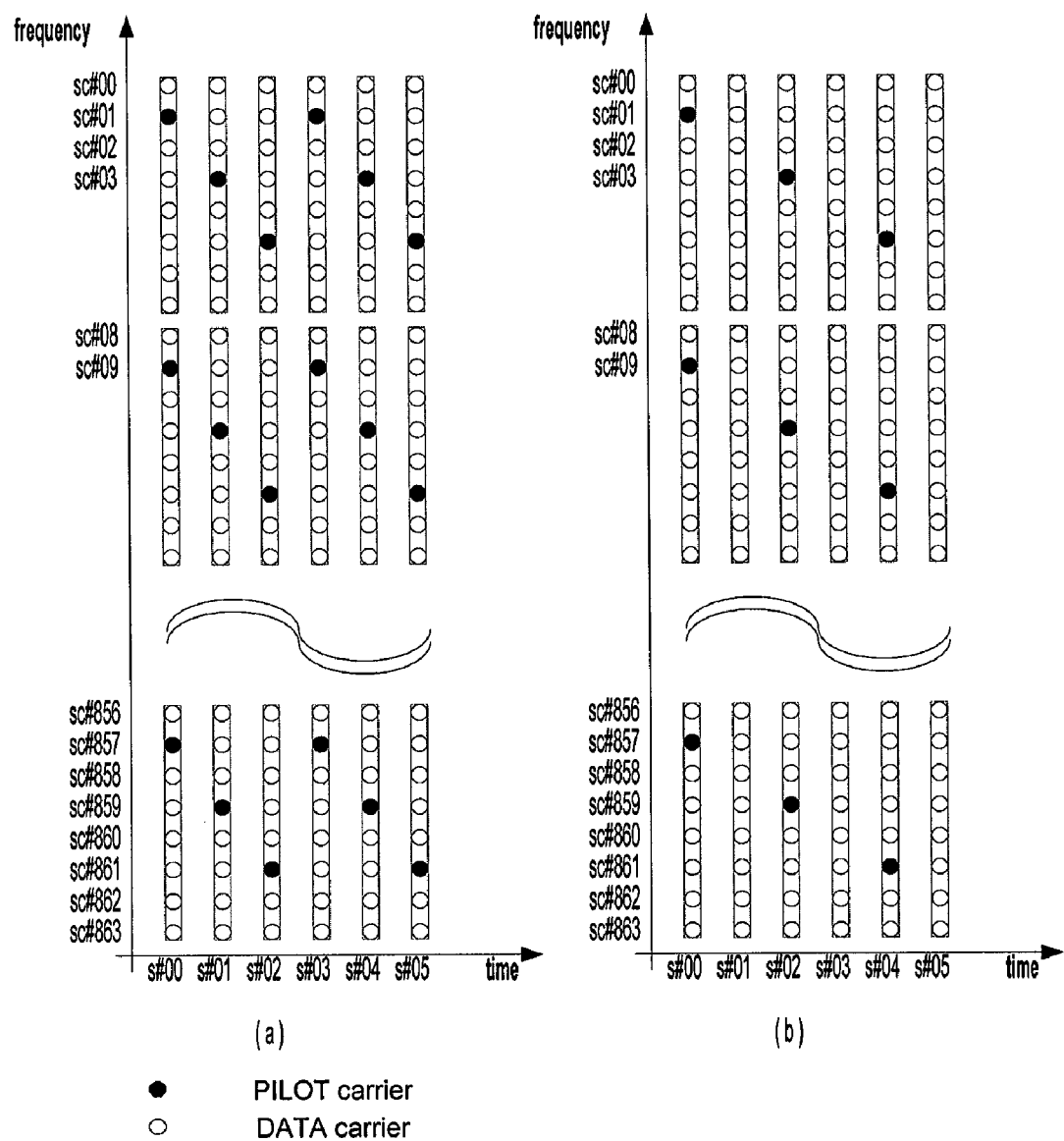

APPARATUS AND METHOD FOR AUTOMATIC GAIN CONTROL OF MOBILE STATION IN OFDM SYSTEM

TECHNICAL FIELD

The present invention relates to an automatic gain control method and apparatus of a mobile station in an orthogonal frequency division multiplexing (OFDM) system. More particularly, the present invention relates to an automatic gain control method and apparatus of a mobile station in an OFDM system including an automatic gain controller (AGC) for automatically controlling a gain of a receiving terminal of a mobile station of an OFDM system, in which the mobile station measures power of a reference signal of a base station, and an amplification gain of a received analog frame signal is automatically controlled according to a difference between the measured power of the reference signal and a threshold value.

BACKGROUND ART

In a conventional method, a mobile station of an orthogonal frequency division multiplexing (OFDM) system uses a preamble signal, which is positioned in a head of an OFDM frame, as a reference signal, measures a power value of the received preamble signal, and controls a gain of an analog amplifier (AMP) according to a difference between the measured power value of the preamble signal and a threshold value.

In the conventional method, there is no problem in estimating a given environment by using a preamble signal, establishing a gain of an amplifier (AMP) of an automatic gain device, and applying the established gain to a data symbol section, when a length of a frame is short and a moving speed of the mobile station is limited. However, many problems occur in applying a channel environment measured during a preamble section to the subsequent data symbol section when the length of the frame increases and the mobile station moves at a high speed.

FIG. 1 is a schematic diagram of a configuration of an automatic gain controller of a mobile station of a conventional OFDM system. FIG. 1 shows a receiving unit of a conventional mobile station of an IEEE. 802.11 OFDM system. A frame signal (an analog signal) that is received from the mobile station through a radio frequency (RF) unit 101 is amplified/attenuated by an amplifier 110 of an automatic gain controller 102 to be a signal that is required by an analog/digital converter (ADC) 103, and is converted to digital data by the ADC 103. In the OFDM system, the converted digital data is converted to frequency domain data by a fast Fourier transform (FFT) unit 104.

In addition, during a preamble section, a channel estimator 105 measures received power of a preamble to compensate signal fading caused in a radio propagation, and a gain controller 111 of the automatic gain controller 102 compares a predetermined threshold value and the measured power value of the preamble to establish a gain of the amplifier 110 of the automatic gain controller 102 according to a difference between the threshold value and the measured power value to operate the automatic gain controller 102.

During a subsequent data symbol section, the same gain is maintained, which is applied to drive the automatic gain controller in the period of frames.

FIG. 2 shows a diagram of a frame configuration of a conventional OFDM-time division duplexing (TDD) system. A preamble is provided to a head of the frame to perform initial synchronization, cell search, and channel estimation. Subsequent DL and UL data symbols include a data subcarrier to allocate data as shown in FIG. 8 and a pilot subcarrier to transmit pilot information for estimating a channel.

During a data symbol section, a channel estimator 105 measures phase, amplitude, and power of a pilot signal in the received data symbol as shown in FIG. 3, measures frequency fading according to a difference between the measured values of the pilot signal and values of a reference pilot signal, and establishes a parameter of an equalizer to compensate a phase error and an amplitude error. Data converted to be in a frequency domain is transmitted to the equalizer 106 to compensate the frequency fading. The data having the compensated frequency fading generally perform an actual demodulation process in a decoder 107 in the OFDM system.

FIG. 3 shows a graph representing a reference signal and a received signal of a pilot channel in a symbol pilot channel estimator. P1 denotes the predetermined pilot signal (i.e., the reference signal), and P2 denotes the received signal. The symbol pilot channel estimator 109 calculates a phase error and a power error according to a difference between P1 (reference signal) and P2 (received signal), and then establishes a parameter to compensate the frequency fading. In the above method, signal fading caused in the radio propagation is calculated for symbol pilot carrier information, a channel compensation value in a symbol frequency bandwidth is estimated by using an interpolator, and the parameter of the equalizer 106 is established. The data converted to be in the frequency domain by the FFT unit 104 is transmitted to the equalizer 106 to compensate the frequency fading. The compensated data is demodulated and decoded by the decoder 107 in the OFDM system.

In the automatic gain control method of the mobile station of the conventional OFDM system, there is no problem in estimating a radio propagation channel by using the preamble signal, and establishing the gain of the amplifier 110 of the automatic gain controller 111 when a length of the frame is short and a moving speed of the mobile station is limited. However, many problems occur in applying the channel environment measured during the preamble section to the subsequent data symbol section when the length of the frame increases and the mobile station moves at a high speed.

DISCLOSURE

Technical Problem

The present invention has been made in an effort to provide an automatic gain control method and apparatus of a mobile station in an orthogonal frequency division multiplexing (OFDM) system, in which a mobile station receives a forward frame signal from a base station, received power of respective reference signals of a preamble section and a data symbol section of the frame signal is measured, a preamble reference signal is used during the preamble section to establish a gain of an amplifier of an automatic gain controller according to a difference between the received power of the reference signal and a threshold value, a pilot signal in a data symbol is used to establish the gain of the amplifier of the automatic gain controller during the data symbol section, and an automatic gain control having a short symbol period may be performed.

Technical Solution

An exemplary automatic gain controller of a mobile station in an orthogonal frequency division multiplexing (OFDM)

system according to an embodiment of the present invention includes an amplifier, an analog/digital converter (ADC), a fast Fourier transform (FFT) unit, a synchronizer, a channel estimator, and a gain controller. The amplifier amplifies/attenuates a received forward frame signal according to a predetermined gain value. The ADC converts the amplified/attenuated signal to digital data. The FFT unit fast Fourier transforms the converted digital data to frequency domain data. The synchronizer provides preamble section and data symbol section information of the received forward frame signal. The channel estimator, based on the information provided from the synchronizer, measures and outputs a power value of a preamble during a preamble section, and measures and outputs a power value of a pilot signal in a data symbol during a data symbol section. The gain controller receives the power value of the preamble from the channel estimator during the preamble section, receives the power value of the pilot signal from the channel estimator during the data symbol section, and respectively establishes gains of the amplifier for the preamble section and the data symbol section according to differences between the power values and a threshold value.

In an exemplary automatic gain control method of a mobile station in an orthogonal frequency division multiplexing (OFDM) system according to an embodiment of the present invention, a) a preamble section and a data symbol section in a received frame signal are identified; b) when a current symbol is the preamble section, a power value of a preamble signal is measured, the measured power value of the preamble signal and a threshold value $P_{REF}$ are compared, and the received frame signal is amplified based on a predetermined gain value (gain=threshold−power value) according to a difference between the measured power value and the threshold value; and c) when the current symbol is the data symbol section, it is determined whether a data symbol section includes a pilot carrier, an average power value of the pilot carrier in the data symbol is measured when the data symbol section includes the pilot carrier, the measured average power value of the pilot carrier and the threshold value are compared, and the received frame signal is amplified based on a predetermined gain value (gain=threshold−pilot average power value) according to a difference between the measured average power value and the threshold value.

In addition, after c), an existing gain is maintained when the data symbol section includes no pilot carrier, a gain value is estimated by estimating a channel in the data symbol including no pilot carrier by using channel information measured by using the pilot carrier during the data symbol section including the pilot carrier, and an automatic gain control operation is performed according to the estimated gain.

DESCRIPTION OF DRAWINGS

FIG. 4 shows a schematic diagram of the automatic gain controller of the mobile station in the OFDM system according to an exemplary embodiment of the present invention.

FIG. 5 shows a diagram representing a gain establishment period of the automatic gain controller according to the exemplary embodiment of the present invention.

FIG. 6 shows an automatic gain control flowchart of the gain controller of the automatic gain controller according to the first exemplary embodiment of the present invention.

FIG. 7 shows an automatic gain control flowchart of the gain controller of the automatic gain controller according to a second exemplary embodiment of the present invention.

FIG. 8 shows a diagram representing subcarriers of the data symbol.

MODE FOR INVENTION

Figure 1:
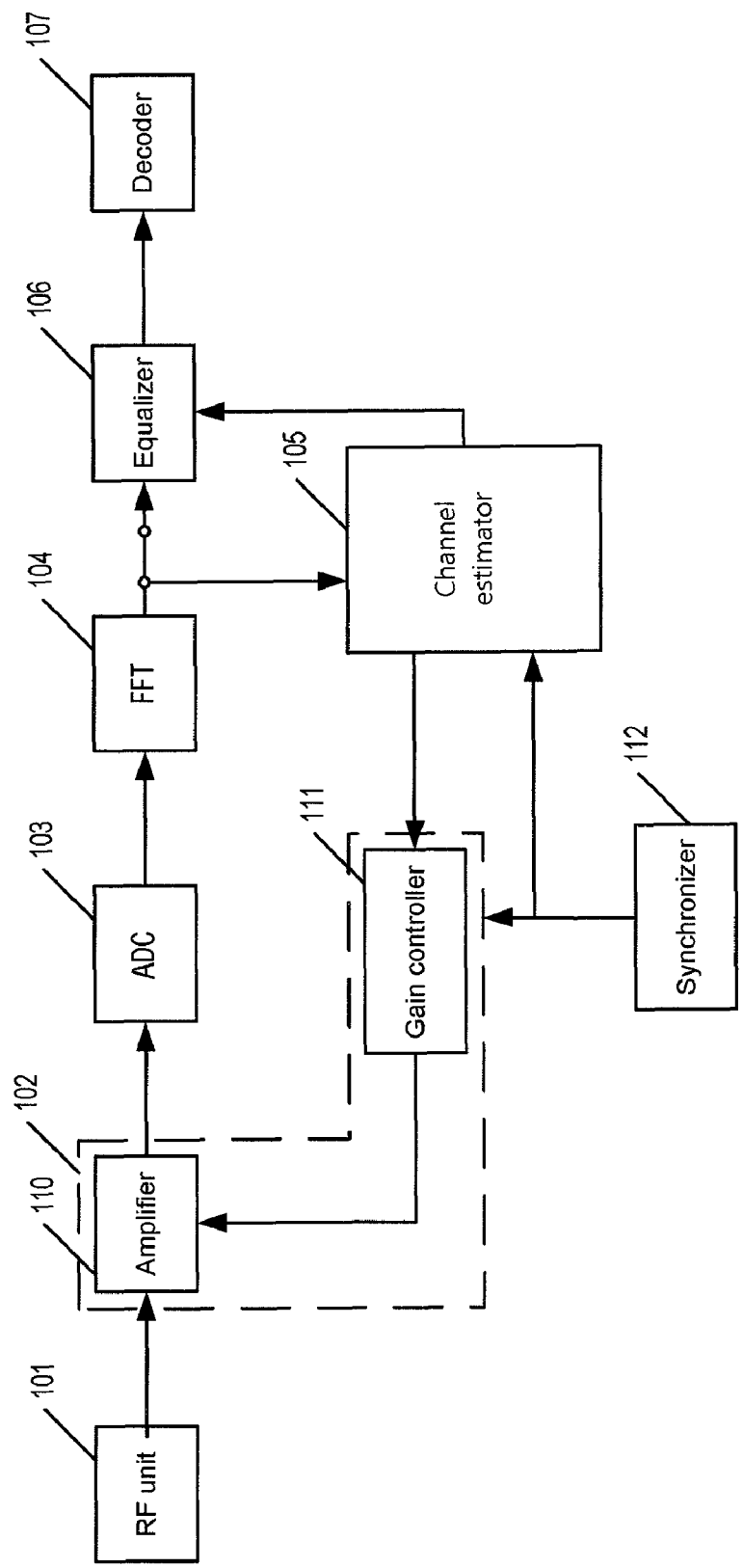
FIG. 1 is a schematic diagram of a configuration of an automatic gain controller of a mobile station of a conventional OFDM system.
Figure 2:
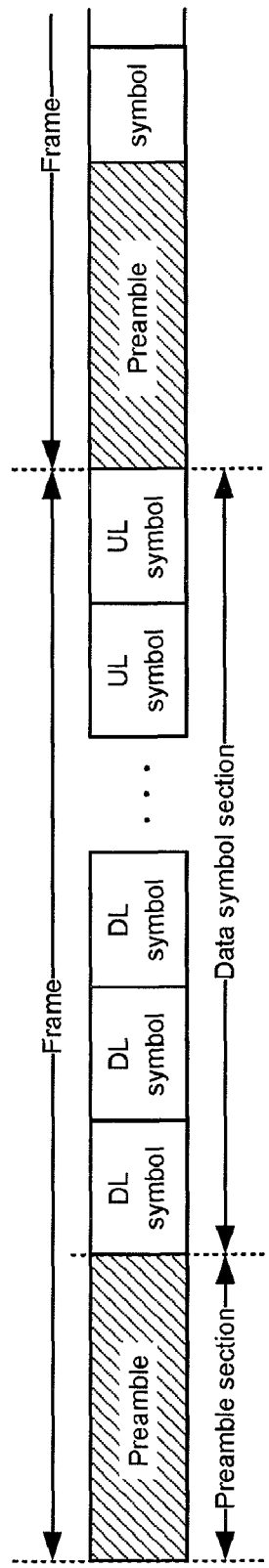
FIG. 2 shows a diagram of a frame configuration of a conventional OFDM-time division duplexing (TDD) system.
Figure 3:
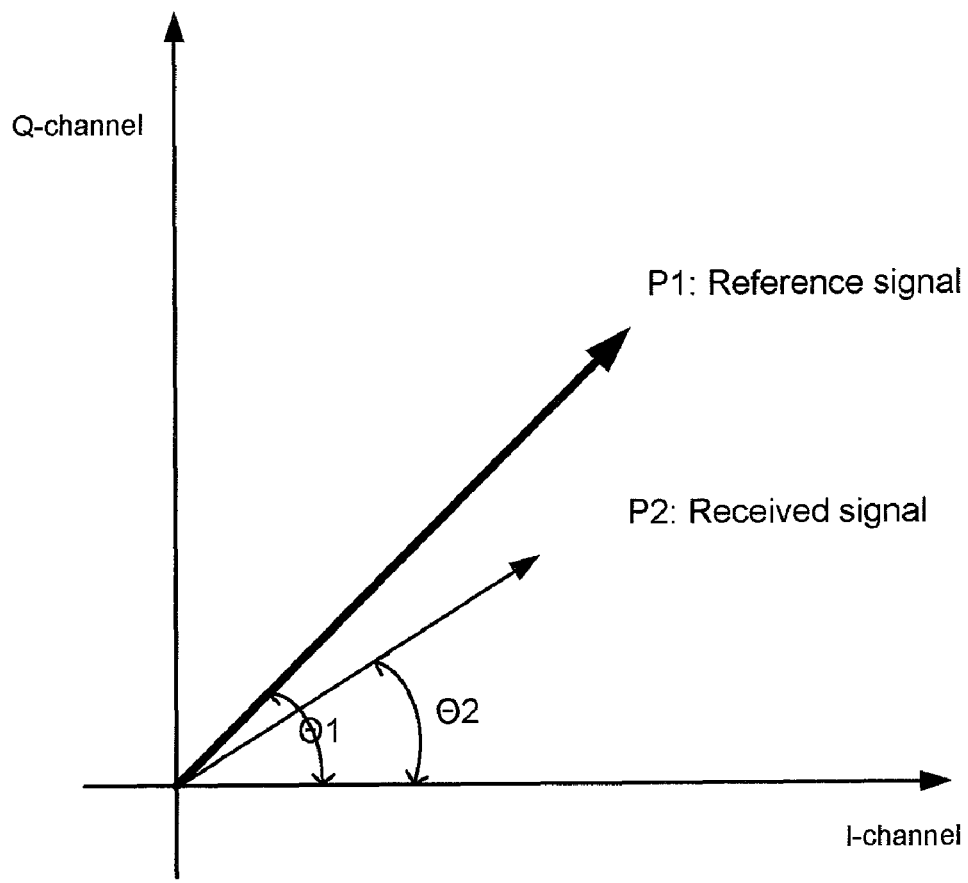
FIG. 3 shows a graph representing a reference signal and a received signal of a pilot channel in a symbol pilot channel estimator.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 4 shows a schematic diagram of the automatic gain controller of the mobile station in the OFDM system according to an exemplary embodiment of the present invention.

The automatic gain controller of the mobile station in the OFDM system according to the exemplary embodiment of the present invention includes a radio frequency unit 101, an amplifier (AMP) 110, an analog/digital converter (ADC) 103, a fast Fourier transform (FFT) unit 104, a synchronizer 112, a channel estimator 105, a gain controller 111, an equalizer 106, and a decoder. The RF unit 101 receives a forward frame signal (analog signal) from a base station to the mobile station in the OFDM system. The AMP 110 amplifies/attenuates the received analog signal according a gain value determined by a gain controller 111 to change the signal to be used in the ADC 103. The FFT unit 104 fast Fourier transforms the digital data converted by the ADC 10 to convert the data to be in the frequency domain. The synchronizer 112 identifies a preamble section and a data symbol section in the frame signal. The channel estimator 105 includes a serving cell preamble channel estimator 108 for measuring power of a preamble during the preamble section and a serving cell symbol pilot channel estimator 109 for using a pilot signal in a data symbol to measure channel characteristics during the data symbol section. The gain controller 111 receives a power value of the preamble from the serving cell preamble channel estimator 108 during the preamble section, receives a power value of the pilot signal from the symbol pilot channel estimator 109 during the data symbol section, and establishes a gain of the amplifier 110 according to a difference between the power values and a threshold value. The equalizer 106 compensates frequency fading by an equalizer parameter for compensating phase and amplitude errors of the data converted to be in the frequency domain by the FFT unit 104. The decoder 107 demodulates the data having the frequency fading compensated by the equalizer 106.

FIG. 5 shows a diagram representing a gain establishment period of the automatic gain controller according to the exemplary embodiment of the present invention.

As shown in FIG. 5, the gain controller 111 of the automatic gain controller 102 compares the preamble power value measured by the serving cell preamble channel estimator 108 and the threshold value, and establishes a gain of the amplifier 110 according to a difference there between during the preamble section, and during the data symbol section, the gain controller 111 of the automatic gain controller uses the pilot power value corresponding to signal intensity of a pilot carrier measured by the serving cell symbol pilot channel estimator 109 using the pilot carrier to determine a channel state of the data symbol section, by using a control signal generated to establish the gain of the amplifier 110.

During the data symbol section, the gain controller 111 of the automatic gain controller 102 uses the power of the pilot carrier measured by the symbol pilot channel estimator 109 to calculate an average power value of the pilot carrier.

Subsequently, the power of the pilot carrier calculated as Equation 1 and the threshold value are compared, and the gain of the amplifier 110 of the automatic gain controller is established in inverse proportion to a difference between the power and threshold value to operate the automatic gain controller 102 of the symbol period.

FIG. 8 shows a diagram representing subcarriers of the data symbol, wherein the pilot carrier is illustrated as a black circle, and a data carrier is illustrated as a white circle.

When there is no pilot carrier in the symbol as shown in FIG. 8 (b), it is required to provide a function for maintaining the existing gain or estimating channel information of a subsequent symbol by using channel information estimated in a symbol including the pilot carrier. In this case, a generally-used estimation method may be applied.

In the exemplary embodiment of the present invention, since the existing gain is maintained during the data symbol section having no pilot carrier, or a channel of the data symbol having no pilot signal is estimated by using the channel information measured by using the pilot signal during the data symbol section having the pilot carrier, the automatic gain controller 102 may be driven.

$$\overline{P} = \frac{1}{N} \cdot \sum_{i=1}^{N} P_i$$ [Equation 1]

$$\Delta G = P_{REF} - \overline{P}$$

$$\because P_i = i_{th} \text{PILOT POWER } (dBm)$$

$$\overline{P} = \text{PILOT AVERAGE POWER } (dBm)$$

$$\Delta G = \text{Gain}$$

ex)

$$\Delta G = 10\text{dB if } \overline{P} = 10 dbm, P_{REF} = 20 dBm$$

$$\Delta G = -10\text{dB if } \overline{P} = 30 dBm, P_{REF} = 20 dBm$$

Another method for establishing the gain of the amplifier 110 will now be described with reference to FIG. 7. As shown in FIG. 7, the gain controller 111 of the automatic gain controller 102 compares the preamble power value measured by the serving cell preamble channel estimator 108 and establishes the gain of the amplifier 110 according to the difference therebetween during the preamble section. In addition, during the data symbol section, the gain controller 111 of the automatic gain controller 102 uses the power of the pilot carrier measured by the pilot channel estimator 109 to calculate an average power value of the pilot carrier, compares the power of the pilot carrier calculated as Equation 2 and the threshold value, establishes the gain to be higher than the existing gain by a predetermined value (e.g., gain=gain+1 dB) when the power value of the pilot signal is lower than the threshold value, and establishes the gain to be lower than the existing gain by the predetermined value (e.g., gain=gain−1 dB) when the power value of the pilot signal is higher than the threshold value. By using the above method, the automatic gain controller 102 of the symbol period may be driven.

$$\Delta G = \Delta G + 1 \text{ dB if}(\overline{P} < P_{REF})$$

$$\Delta G = \Delta G - 1 \text{ dB if}(\overline{P} > P_{REF})$$ Equation 2

FIG. 6 shows an automatic gain control flowchart of the gain controller 111 of the automatic gain controller 102 according to the first exemplary embodiment of the present invention.

The RF unit 101 of the mobile station receives the forward frame signal, and the received forward frame signal is converted to be the frequency domain data by the amplifier 110, the ADC 103, and the FFT unit 104.

Subsequently, the synchronizer 112 receives preamble section and data symbol section information of the frame, determines whether it is a DL symbol section in step 501, and determines in step 502 whether the current symbol in a waiting process is in the preamble section.

When the current symbol is in the preamble section, the power value of the preamble signal measured by the preamble channel estimator 108 is determined in step 503, the measured power value of the preamble signal is compared to the threshold value $P_{REF}$ to determine the gain value (gain=threshold−preamble power value) according to the difference therebetween in step 504, and the gain value determined by the gain controller 111 is transmitted to the amplifier 110 in step 509.

When the current symbol is in the data symbol section, it is determined in step 505 whether the data symbol section includes the pilot carrier, the average power of the pilot carrier measured by the symbol pilot channel estimator 109 is determined in step 506 when the data symbol section includes the pilot carrier, the gain value (gain=threshold−pilot average power value) is determined in step 507 according to a difference between the measured average power value of the pilot carrier and the threshold value $P_{REF}$, and the gain determined by the gain controller 111 is transmitted to the amplifier 110.

In addition, when the data symbol section includes no pilot carrier, the existing gain is maintained, or the channel of the data symbol section including no pilot carrier is estimated by using the channel information measured by using the pilot carrier during the data symbol section including the pilot carrier. The estimated gain value according to the estimated channel is transmitted to the amplifier 110 and the automatic gain controller 102 is driven in step 508.

Accordingly, the amplifier 110 amplifies/attenuates the frame signal (analog signal) received from the RF unit 101 according to the gain value determined by the gain controller 111 to perform the automatic gain control.

FIG. 7 shows an automatic gain control flowchart of the gain controller of the automatic gain controller according to a second exemplary embodiment of the present invention.

In a waiting process, the preamble section and data symbol section information of the frame is identified to determine in step 601 whether it is the DL symbol section, and it is determined in step 602 whether the current symbol of the channel estimator 105 is the preamble section.

When the current symbol is the preamble section, the power value of the preamble signal measured by the preamble channel estimator 108 is determined in step 603, the gain value (gain=threshold−preamble power value) according to the difference between the measured power value of the preamble signal and the threshold value $P_{REF}$ is determined in step 604, and the gain value determined by the gain controller 111 is transmitted to the amplifier 110 in step 611.

When the current symbol is the data symbol section, it is determined in step 605 whether the data symbol section includes the pilot carrier. The average power of the pilot carrier measured by the symbol pilot channel estimator 109 is determined in step 606 when the data symbol section includes the pilot carrier. The measured average power value of the pilot carrier is compared to the threshold value $P_{REF}$ in step 607, the predetermined gain is reduced by a predetermined value in step 609 when the measured average power value is equal to or higher than the threshold value (e.g., gain=gain−1 dB), the predetermined gain is increased by the predetermined value in step 608 when the measured average power value is lower than the threshold value (e.g., gain=gain+1 dB), and the gain is transmitted to the amplifier 110 to perform the automatic gain control in step 611.

In addition, it is determined in step 605 whether the data symbol section includes the pilot carrier, and the existing gain is maintained when the data symbol section includes no pilot carrier, or the channel of the data symbol including no pilot carrier is estimated, during the data symbol section including the pilot carrier, by using the channel information measured by using the pilot carrier. The estimated gain is transmitted to the amplifier 110 to operate the automatic gain controller 102 in step 610.

Accordingly, the amplifier 110 amplifies/attenuates the frame signal (analog signal) received by the RF unit 101 according to the determined gain value to perform the automatic gain control.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention as described above, since the mobile station of the OFDM system measures received power of respective reference signals of the preamble section and the data symbol section of the forward frame signal received from the base station, and the amplifier of the automatic gain controller is controlled according to a difference between the received power of the reference signal and the threshold value, a communication system that is robust to channel variation and various fading environments may be provided to efficiently perform the automatic gain control in a mobile station channel environment of the OFDM.

The invention claimed is:

1. An automatic gain controller of a mobile station in an orthogonal frequency division multiplexing (OFDM) system, the automatic gain controller comprising:
   an amplifier for at least one of amplifying or attenuating a received forward frame signal according to a predetermined gain value;
   an analog to digital converter (ADC) for converting the at least one of amplified or attenuated signal to digital data;
   a fast Fourier transform (FFT) unit for fast Fourier transforming the digital data to frequency domain data;
   a synchronizer for providing preamble section and data symbol section information of the received forward frame signal;
   a channel estimator, identifying a preamble section and a data symbol section based on the information provided from the synchronizer, for measuring and outputting a power value of a preamble during the preamble section, and measuring and outputting an average power value of a pilot signal in a data symbol during the data symbol section; and
   a gain controller for receiving the power value of the preamble from the channel estimator during the preamble section, receiving the measured average power value of the pilot signal in the data symbol from the channel estimator during the data symbol section, and establishing gain of the amplifier for the preamble section according to a difference between the power value of the preamble and a threshold value,
   wherein, the gain controller compares the measured average power value of the pilot signal in the data symbol with the threshold value and reduces the gain of the amplifier by a predetermined value when the measured average power value of the pilot signal in the data symbol is equal to or higher than the threshold value, and
   wherein the gain controller increases the gain of the amplifier by the predetermined value when the measured average power value of the pilot signal in the data symbol is lower than the threshold value.

2. The automatic gain controller of claim 1, wherein the channel estimator comprises:
   a serving cell preamble channel estimator for measuring the power value of the preamble during the preamble section; and
   a serving cell symbol pilot channel estimator for measuring the power value of the pilot signal in the data symbol during the data symbol section.

3. The automatic gain controller of claim 1, further comprising:
   an equalizer for compensating frequency distortion of the frequency domain data by using an equalizer parameter for compensating phase and amplitude errors; and
   a decoder for demodulating the compensated frequency domain data.

4. An automatic gain control method of a mobile station in an orthogonal frequency division multiplexing (OFDM) system, the automatic gain control method comprising:
   a) identifying a preamble section and a data symbol section in a received frame signal;
   b) when a current symbol is in the preamble section, measuring a power value of a preamble signal, comparing the measured power value of the preamble signal and a threshold value $P_{REF}$, and amplifying the received frame signal according to a difference between the measured power value of the preamble signal and the threshold value; and
   c) when the current symbol is in the data symbol section, determining whether the data symbol section includes a pilot carrier in a data symbol, and measuring an average power value of the pilot carrier in the data symbol when the data symbol section includes the pilot carrier,
   wherein, in c), when the data symbol section includes the pilot carrier, the average power value of the pilot carrier in the data symbol is measured, the measured average power value of the pilot carrier and the threshold value are compared, and the predetermined gain is increased or reduced by a predetermined value,
   wherein, when the measured average power value of the pilot carrier is equal to or higher than the threshold value, the predetermined gain is reduced by the predetermined value, and the received frame signal is attenuated,
   wherein, when the measured average power value of the pilot carrier is lower than the threshold value, the predetermined gain is increased by the predetermined value and the received frame signal is amplified.

5. The automatic gain control method of claim 4, further comprising, after c), maintaining an existing gain when the data symbol section includes no pilot carrier, estimating a gain value by estimating a channel in the data symbol including no pilot carrier by using channel information measured by using the pilot carrier of another data symbol section including the pilot carrier, and performing an automatic gain control operation according to the estimated gain value.

* * * * *